(12) United States Patent
Aumann et al.

(10) Patent No.: US 11,460,454 B2
(45) Date of Patent: Oct. 4, 2022

(54) METHOD FOR MONITORING, EVALUATING, AND CONTROLLING A CYCLIC CHROMATOGRAPHIC PURIFICATION PROCESS

(71) Applicant: ChromaCon AG, Zurich (CH)

(72) Inventors: Lars Aumann, Zurich (CH); Thomas Müller-Späth, Zurich (CH); Michael Bavand, Lenzburg (CH)

(73) Assignee: ChromaCon AG, Zurich (CH)

( * ) Notice: Subject to any disclaimer, the term of this patent is extended or adjusted under 35 U.S.C. 154(b) by 330 days.

(21) Appl. No.: 16/765,017

(22) PCT Filed: Nov. 6, 2018

(86) PCT No.: PCT/EP2018/080261
§ 371 (c)(1),
(2) Date: May 18, 2020

(87) PCT Pub. No.: WO2019/096622
PCT Pub. Date: May 23, 2019

(65) Prior Publication Data
US 2020/0355655 A1    Nov. 12, 2020

(30) Foreign Application Priority Data
Nov. 16, 2017    (EP) .................................. 17202010

(51) Int. Cl.
*G01N 30/86*    (2006.01)
*B01D 15/18*    (2006.01)
*G01N 30/60*    (2006.01)

(52) U.S. Cl.
CPC ..... *G01N 30/8624* (2013.01); *B01D 15/1807* (2013.01); *B01D 15/1871* (2013.01); *G01N 30/6034* (2013.01)

(58) Field of Classification Search
None
See application file for complete search history.

(56) References Cited

U.S. PATENT DOCUMENTS

| | | |
|---|---|---|
| 6,217,774 B1 | 4/2001 | Nagamatsu et al. |
| 2005/0230297 A1 | 10/2005 | Ogawa |

(Continued)

FOREIGN PATENT DOCUMENTS

| | | |
|---|---|---|
| DE | 198 42 550 A1 | 3/2000 |
| EP | 1 877 769 B1 | 12/2010 |

(Continued)

OTHER PUBLICATIONS

Linda Mathiasson et al., "Continuous chromatography beyong affinity capture of monoclonal anitbodies", GE Healthcare, 2017 (1 page total).

(Continued)

*Primary Examiner* — Tam M Nguyen
(74) *Attorney, Agent, or Firm* — Sughrue Mion, PLLC

(57) ABSTRACT

A method for monitoring, evaluating and controlling a cyclic chromatographic purification process that involves at least two adsorbers. According to the method, one step is monitoring of the chromatogram, including the measurement of at least one current concentration-proportional signal in the liquid. Another step is conducting an evaluation of the chromatogram, including a comparison of at least one of the current concentration-proportional signals measured in the monitoring step with a threshold value thereof. A further step is controlling the chromatographic purification process by adapting the termination of the currently running phase as a function of the comparison of the evaluation step and initiating the next phase. Finally, according to the method, the sequence of steps is carried out in given order at least twice.

23 Claims, 11 Drawing Sheets

(56) References Cited

U.S. PATENT DOCUMENTS

| | | | |
|---|---|---|---|
| 2010/0186587 A1 | 7/2010 | Kessler et al. | |
| 2017/0241992 A1 | 8/2017 | Muller-Spath et al. | |
| 2018/0051054 A1* | 2/2018 | Vetter | C07K 16/00 |
| 2020/0054964 A1* | 2/2020 | Blom | G01N 30/42 |
| 2020/0355655 A1* | 11/2020 | Aumann | B01D 15/1864 |

FOREIGN PATENT DOCUMENTS

| | | |
|---|---|---|
| WO | 2006/116886 A1 | 11/2006 |
| WO | 2010/010366 A1 | 1/2010 |
| WO | 2014/166799 A1 | 10/2014 |

OTHER PUBLICATIONS

GE Healthcare, "Continuous chromatography in downstream processing of a monoclonal antibody", 2015 (8 pages total).

Linda Mathiasson et al., "The use of dynamic control in periodic counter-current chromatography", GE Healthcare, 2015 (1 page total).

GE Healthcare, "The use of dynamic control in periodic counter-current chromatography", 2016 (8 pages total).

Rebecca A. Chmielowski et al., "Definition and dynamic control of a continuous chromatography process independent of cell culture titer and impurities", Journal of Chromatography A, 2017, vol. 1526, pp. 58-69 (37 pages total).

Agilent Technologies, "Sophisticated peak-based fraction collection—working with up and down slope", 2010 (12 pages total).

Marcus Degerman et al., "A Model-Based Approach to Determine the Design Space of Preparative Chromatography", Chem. Eng. Technol., 2009, vol. 32, No. 8, pp. 1195-1202 (8 pages total).

Ju Weon Lee et al., "Comparison of Recycle Chromatography and Simulated Moving Bed for Pseudobinary Separations", Ind. Eng. Chem. Res., 2009, vol. 48, pp. 7724-7732 (9 pages total).

Yichu Shan et al., "Analysis of the Isolation of a target component using multicomponent isocratic preparative elution chromatography", Journal of Chromatography A, 2004, vol. 1041, pp. 53-62 (10 pages total).

Georges Guiochon et al., "Fundamentals of Preparative and Non-linear Chromatography", Academic Press, Second Edition, 2006, pp. 12 and 854 (5 pages total).

Thomas-Muller Spath et al., "Enabling high purities and yields in therapeutic peptide purification using multicolumn countercurrent solvent gradient purification", Pharmaceuticals Purification, Chimica Oggi—Chemistry Today, 2013, vol. 31, No. 5, pp. 56-60 (5 pages total).

Rüdt et al., "Real-Time Monitoring and Control of the Load Phase of a Protein A Capture Step", Biotechnology and Bioengineering, Feb. 2017, vol. 114, No. 2, pp. 368-373 (6 pages).

International Search Report for PCT/EP2018/080261 dated Jan. 21, 2019 [PCT/ISA/210].

Written Opinion of The International Searching Authority for PCT/EP2018/080261 dated Jan. 21, 2019 [PCT/ISA/237].

* cited by examiner

US 11,460,454 B2

METHOD FOR MONITORING, EVALUATING, AND CONTROLLING A CYCLIC CHROMATOGRAPHIC PURIFICATION PROCESS

CROSS REFERENCE TO RELATED APPLICATIONS

This application is a National Stage of International Application No. PCT/EP2018/090261 filed Nov. 6, 2018, claiming priority based on European Patent Application No. 17202010.9 filed Nov. 16, 2017.

TECHNICAL FIELD

The present invention relates to methods for monitoring, evaluating and controlling a cyclic chromatographic purification processes.

PRIOR ART

Chromatographic processes are used for the purification of products from complex mixtures.

In case of "difficult" chromatographic separations, the product of interest is accompanied by side-compounds (impurities) with very similar adsorptive behavior. In chromatograms of traditional single adsorber chromatography this leads to overlapping parts of product and different side-compounds in the front part and in the back part of the product peak, requiring a center-cut purification. The purification is also referred to as ternary separation challenge as, in a chromatogram, the compounds to be separated can be grouped into three classes, the early-eluting (weakly adsorbing) impurities/side-compounds, the center-eluting "product", and the late-eluting (strongly adsorbing) impurities/side-compounds. The overlapping fractions in the front and in the back of the product peak, respectively, contain both product of interest and impurities/side-compounds and usually have to be discarded because their purity does not meet set specifications. This means that in such ternary separation challenge, a high purity product fraction can only be obtained at the cost of yield. Including the side fractions would improve the yield by including additional product compound but would lower the purity due to inclusion of side compounds/impurities. This situation is also known as yield-purity trade-off.

Various chromatography processes using recycling techniques have been suggested to recover the product contained in impure side fractions, aiming at alleviating the yield-purity-trade-off. Processes using a single adsorber and collecting impure side-fractions in separate vessels for purification at a later point in time have been suggested in cases where reprocessing is compatible with regulatory guidelines.

In some processes, the impure side-fractions are recycled directly onto the same adsorber without intermediate storage.

Chromatographic processes with more than one chromatographic adsorber allow combining the use of internal recycling of impure side-fractions and the use of counter-current principles, i.e. a relative opposite movement of stationary phase (adsorber material) and mobile phase (fluids). By means of internal recycling of impure side fractions the product compound contained in these fractions can be firstly transferred directly from one adsorber to another without storage in an external reservoir and secondly separated by counter-current principles and recovered.

The powerful combination of internal recycling and counter-current principles allows producing product compound with high yield and purity simultaneously in multi-adsorber processes. These processes are also known as simulated moving bed (SMB) processes. The use of early SMB processes was limited to binary separations, i.e. separations of two product compounds or separation of one product compound and one group of either early or late eluting impurities/side-compounds. Ternary separation of product overlapping with side-compounds in the front and in the back of the product peak could only be achieved by coupling two SMB processes, potentially requiring a concentration step in-between the two SMB setups. The complexity of these setups was prohibitive to its practical application, and led to the development of alternative processes for ternary separations using counter-current principles. Moreover SMB processes cannot use linear solvent gradients, which are important for the separation of compounds with similar adsorptive properties.

In this regard, a very efficient process for ternary separations with linear solvent gradient capabilities is known as "MCSGP" process (Multicolumn countercurrent solvent gradient purification) and has been well established in industry, (see EP-A-1 877 769). This process has been described for 2-8 adsorbers.

Other chromatographic multi-adsorber techniques using a multitude of adsorbers and internal recycling have been suggested, such as a "gradient with steady state recycle" (GSSR) process. In the past years, most applications of multi-adsorber counter-current chromatography processes have been described for the two-adsorber MCSGP process, which has the advantage of low equipment complexity and high operational flexibility with respect to use of flow rates, switch times and operation in linear solvent gradient mode.

US-A-2017241992 proposes a method for control and/or monitoring and/or optimization of a chromatographic process, in which the method comprises at least 2 columns which are operated, alternatingly, wherein this operation can be carried out in that the at least 2 columns are operated in interconnected and disconnected states, wherein the columns switch positions after such a sequence of interconnected and disconnected state, and wherein downstream of at least one, or of each column, a detector is located capable of detecting the desired product and/or impurities when passing the detector.

WO-A-2014166799 relates to a chromatographic purification method for the isolation of a desired product fraction from a mixture using 2 chromatographic columns (adsorbers), it relates to methods for setting up such a process, and it also relates to control and/or monitoring and/or optimization processes in this context. The method comprises, within one cycle to be carried out at least once, the following steps: a first batch step (B1), wherein during a batch timespan said adsorbers are disconnected and a first adsorber is loaded with feed via its inlet using a first flow rate and its outlet is directed to waste, and from a second adsorber desired product is recovered via its outlet and subsequently the second adsorber is regenerated; a first interconnected step (IC1), wherein the outlet of the first adsorber is connected to the inlet of the second adsorber during an interconnected timespan, the first adsorber is loaded beyond its dynamic breakthrough capacity with feed via its inlet using a second flow rate which is the same or larger than the first flow rate, and the outlet of the second adsorber is directed to waste, a second batch step (B2) analogous to the first batch step (B1)

but with exchanged adsorbers; a second interconnected step (IC2), analogous to the first interconnected step (IC1) but with exchanged adsorbers.

SUMMARY OF THE INVENTION

It is one object of the present invention to propose an improved method for monitoring, evaluating and controlling a cyclic chromatographic purification process.

The proposed method monitors the elution of the chromatographic profile, i.e. a concentration-proportional signal, and takes action while the elution is ongoing, thus having immediate effect. Moreover the method neither requires a chromatographic model describing the separation nor a control algorithm taking action based on a finite error between an actual value and a set point. In contrast, the method uses threshold values and initiates control actions based on reaching or surpassing the thresholds. For determination of the set points the method does require some knowledge about the chromatographic separation which can be acquired by evaluating a design gradient chromatogram. In some cases the set points can be determined automatically, e.g. relative to a peak maximum. Thereby the position of the chromatogram with respect to elution time/volume (x-axis) is not relevant for determining the set points, which are only based on the magnitude of the chromatogram (y-axis).

The proposed process control method addresses the issue of environmental and operating parameter fluctuations and differences in adsorber performance which can lead to suboptimal process performance of counter-current processes. With the proposed method the process operates robustly at its set point.

The proposed method comprises the elements of a.) essentially continuously monitoring and b.) evaluating of the chromatogram, preferably at the outlet of the adsorber that is performing the elution tasks and c.) triggering a control action based on the evaluated information.

More specifically, the present invention relates to a method for monitoring, evaluating and controlling a cyclic chromatographic purification process involving at least two adsorbers (preferably two and no more adsorbers, 3 and no more adsorbers or 4 and no more adsorbers), through which a liquid with a feed mixture (Feed), comprising the desired product components (or compounds) (P) as well as impurities (W,S), is passed.

Typically the adsorbers are operated alternatingly, in that the at least two adsorbers are operated in a sequence of interconnected and disconnected phases and in that the adsorbers switch positions after such sequence of interconnected and disconnected phases. In case there are two adsorbers, for example two columns, that sequence is fully defined. In this context it is to be noted that each one of these two adsorbers can also be given by a group of two, three or four or even more adsorbers (columns) which are interconnected in series and maintained in that interconnected sequence without any disconnection in the process. For the situation where there are more than two adsorbers, the sequences of interconnected and disconnected phases are maintained in the sense that always the interconnected phase linking two adsorbers (or groups of adsorbers) I1 is followed by a batch phase B1 wherein the same two adsorbers are operated and product P is eluted from the formerly upstream adsorber (or group of adsorbers). Therefore a control as outlined in FIGS. 3-8 and described further below is feasible also in a processes using 3 or more columns as they only require the existence of an interconnected and a batch phase in this sense, and the concentration proportional signal as detailed below is then preferably measured at the outlet of at least one of these same adsorbers, preferably at the outlet just of the upstream adsorber, or at the outlet of the two adsorbers or at the outlet of all adsorbers. Further preferably the concentration-proportional signal can be measured at at least one of the following positions: the outlet of the adsorber being in a batch elution phase (B1) of the desired product, the outlet of the upstream adsorber in an interconnected phase (I1, I2), and preferably only at these positions. In parallel to each such sequence I1, B1 which involve two adsorbers or groups of adsorbers, additional adsorbers or groups of adsorbers may perform other tasks independently, such as e.g. a cleaning, an equilibration or a reaction step.

In parallel to each phase I1, B1, but also in parallel to phases I2, B2, that involve two further adsorbers or groups of adsorbers, additional adsorbers or groups of adsorbers may perform other tasks independently such as e.g. a cleaning, an equilibration or a reaction step. An example of such process for three adsorbers is provided in FIG. 10$a$. Thus, in the process using 3 adsorbers or groups of adsorbers the adsorber positions are only changed after phase B2 in processes. In an analogous way, a process with 4 adsorbers or groups of adsorbers can be operated, as illustrated in FIG. 10$b$.

Also processes as laid down in EP 1 877 769 B1 are fully compliant and can be operated using the present concept with the requirement of having an interconnected phase followed by a batch phase, thus the invention is applicable here too (e.g. for processes according to FIG. 20, 22 or 23 in EP 1 877 769 B1). In EP 1 877 769 B1, the interconnected phases corresponding to "I1" and "I2" are denominated by "CCL" and the batch phases "B1" and "B2" are denominated "BL". As concerns the impurities (W,S), there can only be just one impurity (W or S), so a (binary) distribution with only more weakly adsorbing impurities (W) than the product. Or there can only be more strongly adsorbing impurities (S) than the product. Also possible is the situation where there are more weakly adsorbing impurities (W) than the product as well as more strongly adsorbing impurities (S) than the product.

The purification process comprises at least two different phases (I, B):

at least one interconnected phase (I), in which the two adsorbers are interconnected in that the outlet of an upstream adsorber is fluidly connected to the inlet of a downstream adsorber, and at least one batch phase (B), in which at least one adsorber is not fluidly connected to the others and in which the desired product components (P) are recovered in purified form, preferably form from a disconnected adsorber.

According to the invention, the method comprises at least the following steps:

a. monitoring of the chromatogram including the measurement of at least one current concentration-proportional signal in the liquid;

b. evaluation of the chromatogram including a comparison of at least one of said current concentration-proportional signals measured in step a. with a threshold value thereof;

c. controlling the chromatographic purification process by adapting the termination of the currently running phase as a function of the comparison of step b. and initiating the next phase, wherein the sequence a.-c. is carried out in given order at least twice after each other in one separation process.

So the process is carried out cyclically by repeating the sequence a.-c. as often as required or necessary.

Typically the process is cycled by repeating the sequence a.-c. for a certain time, e.g. for a time span between 10' and 200 h or often 12-52 h or 24-48 h. Alternatively the process is carried out cyclically by repeating the sequence a.-c. depending on the feed volume, i.e. the sequence a.-c. is repeated until the feed volume has been treated.

E.g. in case of a continuous fermentation based process, the sequence a.-c. can be cycled until the fermentation process is terminated, which can be up to several weeks or months, e.g. 1-20 weeks or 4-8 weeks. Or the process is continuously run, i.e. the sequence a.-c. is repeated until the adsorbers have to be replaced or cleaned.

According to a first preferred embodiment, the concentration-proportional signal is taken account of in terms of at least one of its absolute value, its integral, its slope and the sign of its slope, wherein preferably a combination of these is taken account of, most preferably a combination of the absolute value and the sign of its slope.

The concentration-proportional signal measured in step a. can preferably be measured at the outlet of at least one adsorber, preferably at the outlet of two adsorbers or at the outlet of all adsorbers. Further preferably the concentration-proportional signal can be measured at at least one or only at one of the following positions: the outlet of an adsorber being in a batch elution phase (B1) of the desired product, the outlet of the upstream adsorber in an interconnected phase (I1, I2). So preferably, just the concentration proportional signal at the outlet of the upstream adsorber of the two active ones is measured, and in the batch phase of the one eluting the product.

According to a preferred embodiment, the purification process comprises at least four different phases (I1, B1, I2, B2) in given order,
at least one first interconnected phase (I1), in which two adsorbers are interconnected in that the outlet of an upstream adsorber is fluidly connected to the inlet of a downstream adsorber, solvent is entered by way of the inlet into the upstream adsorber, and desired product components (P) as well as weakly adsorbing impurities (W) are transferred from the upstream adsorber to the downstream adsorber, preferably until essentially only desired product components (P) exit by the outlet of the upstream adsorber, wherein preferably in-line dilution is carried out between the upstream and the downstream adsorber;
at least one first batch phase (B1), in which the adsorbers are not fluidly connected, and in which solvent is entered by way of the inlet into an upstream adsorber from the first interconnected phase (I) and via the outlet of this product eluting adsorber the desired product components (P) are collected, while liquid with a feed mixture (Feed) is entered by way of the inlet into the downstream adsorber from the first interconnected phase (I1) and via the outlet of this adsorber weakly adsorbing impurities normally are collected;
at least one second interconnected phase (I2), in which two adsorbers are interconnected in that the outlet of the upstream adsorber from the first interconnected phase (I1) is connected to the inlet of the downstream adsorber of the first interconnected phase (I1), solvent is entered by way of the inlet into the upstream adsorber, and desired product compounds (P) as well as strongly adsorbing impurities (S) are transferred from the upstream adsorber to the downstream adsorber, preferably until essentially no more desired product compounds (P) exit by the outlet of the upstream adsorber, wherein further preferably in-line dilution is carried out between the upstream and the downstream adsorber;
and at least one second batch phase (B2), in which the adsorbers are not fluidly connected, and in which solvent is entered by way of the inlet into the upstream adsorber from the second interconnected phase (I2) and via the outlet of this former upstream adsorber the strongly adsorbing impurities (S) are collected, while solvent is entered by way of the inlet into downstream adsorber from the second interconnected phase (I2) and via the outlet of this former downstream adsorber weakly adsorbing impurities are collected, wherein the functions of the phases (I1, B1, I2, B2) are either fulfilled synchronously or, preferably, sequentially, and carried out in a cyclic manner at least twice, wherein when cycling after or within a switch time the former upstream adsorber from the second batch phase (B2) is moved to become the downstream adsorber in the following first interconnected phase (I1), and the former downstream adsorber from the second batch phase is moved to become the upstream adsorber in the following first interconnected phase (I1). This process is essentially the one as illustrated in FIG. 1 detailed below.

In the context of such a purification method step a. preferably includes measurement of at least one current concentration-proportional signal in the liquid at the outlet of the upstream adsorber in the first interconnected phase (I1), wherein preferably at least one of the absolute value and the sign of its slope is measured, preferably a combination of the two.

The absolute value and preferably also the sign of its slope can be measured, and upon exceeding an absolute value threshold, the following first batch phase (B1) can be initiated, either as a fixed duration first batch phase or as a first batch phase having a length adapted upon further monitoring, evaluation and control.

Upon exceeding an absolute value threshold, a fixed delay can be waited until the following first batch phase (B1) is initiated, either as a fixed duration first batch phase or as a first batch phase having a length adapted upon further monitoring, evaluation and control.

Upon exceeding a first absolute value threshold, a minimum fixed delay can be waited and after that upon exceeding a second absolute value threshold, preferably under checking the additional condition that its slope is positive, the following first batch phase (B1) is initiated, either as a fixed duration first batch phase or as a first batch phase having a length adapted upon further monitoring, evaluation and control.

When mentioning a first batch phase B1 having a length adapted upon further monitoring, evaluation and control, this is for example referring to the control of the length of the product elution step as detailed further below.

These different methods for determining when the product elution step shall start can also be combined.

Step a. may include measurement of at least one current concentration-proportional signal in the liquid at the outlet of the product eluting adsorber in the first batch phase (B1), wherein preferably at least one of the absolute value and the sign of its slope is measured, preferably a combination of the two. In the context of such a measurement, upon falling below an absolute value threshold, preferably under (continuously) checking the additional condition that its slope is negative, the following second interconnected phase (I2) can be initiated, either as a fixed duration second interconnected phase or as a second interconnected phase having a length adapted upon further monitoring, evaluation and control.

Step a. may also include measurement of at least one current concentration-proportional signal in the liquid at the outlet of the upstream adsorber in the second interconnected phase (I2), wherein preferably at least one of the absolute value and the sign of its slope is measured, preferably a combination of the two, wherein, preferably under checking the additional condition that its slope is negative, upon falling below an absolute value threshold, the following second batch phase (B2) is initiated, either as a fixed duration second batch phase or as a second batch phase having a length adapted upon further monitoring, evaluation and control.

The cyclic chromatographic process may use at least two adsorbers and each cycle may comprise at least two interconnected phases in which two adsorbers are fluidly connected for internal recycling of different partially pure side fractions (W/P, P/S). Preferably in step a. at least one of the absolute signal and its slope is measured at the outlet of the respective upstream adsorber.

Also a change of the sign if slope can be used as criterion for a control action.

An elution gradient of the process can have a constant slope with respect to volume of liquid mobile phase used in the process over both interconnected and the first batch phase (I1, B1, I2) or it may be run in isocratic mode (slope of zero).

The threshold for stopping a phase of the process and initiating a new phase of the process can preferably be defined in relation to the concentration-proportional signal recorded during the same or a previous cycle of the chromatographic process.

Further, a control action can be triggered based on failing to reach a defined threshold within a pre-determined elution volume or time or gradient concentration.

The concentration-proportional signal is typically based on visible light, UV, infrared, fluorescence, Raman, ionic strength, conductivity or refractive index measurement.

One preferred way of monitoring of the chromatogram includes monitoring a concentration-proportional signal at the outlet of at least one of the adsorbers, preferably at both outlets in case of two adsorbers, and preferably at the outlet of each adsorber in case of using more than two adsorbers.

The monitoring of the concentration-proportional signal can be carried out by collecting the UV signal, which can be in terms of its absolute signal, its integral, its slope or the sign of its slope.

A preferred way of evaluating the chromatogram is to compare the current value of at least one of the aforementioned parameters with a set point value and to elicit a control action based on the comparison.

A preferred control action is to stop a currently running phase, e.g. IC for internal product recycling, and to initiate the next phase, e.g. B1 for product collection.

It was found that the control method can compensate for changes in process parameters such as composition and temperature of the mobile phase, temperature of the adsorber, packed bed height difference in case of column format adsorbers, packing compression in case of column format adsorbers, fouling, and capacity decline, leading to shifts of the chromatogram.

The monitoring part of the method may include recording the values of the concentration-proportional signal and/or the slope of this signal at the outlet of the upstream adsorber during phases I1, B1, and I2 and during the elution of the compound "W" in zone 4 in phase B2.

By monitoring the slope of the concentration-proportional signal, the method can be applied to trigger a control action in the peak front (slope of concentration-proportional signal>0) or the peak tail (slope of concentration-proportional signal<0). The evaluation part of the method continuously checks if the concentration-proportional signal has reached a defined threshold value and triggers a control action if the threshold value is reached.

The threshold value may be pre-set (e.g. based on knowledge of the design chromatogram) or automatically determined by the control method based on information from one or several previous cycles. For instance, the threshold can be expressed as percentage of the peak height of the main compound or an earlier eluting "W" compound.

In a further preferred embodiment, the method for monitoring, evaluating, and controlling a multi-adsorber countercurrent solvent gradient purification process comprises the following elements:

a. monitoring a concentration-proportional signal in terms of its absolute signal, its integral, its slope or the sign of its slope or a combination thereof and b. evaluation of the chromatogram including continuously comparing the current value of at least one of the aforementioned parameters with a set point value and c. controlling the process includes termination of a currently running phase of the multi-adsorber countercurrent solvent gradient purification process based on the matching of the of the current value with the set point value, and initiation of a new phase wherein a.-c. are carried out at least once during the operation of the purification process. The expression concentration-proportional signal in the sense of this invention may refer to proportionality of the signal to concentration of product or impurities in the chromatographic run, but alternatively may refer to proportionality to concentration of modifier including, but not limited to, at least one of salt concentration or concentration of organic modifier.

In a preferred embodiment, the multi-adsorber countercurrent solvent gradient purification process uses two adsorbers. It is however also possible to use more than 2 adsorbers, for example 3, 4, 5, or even 6 adsorbers.

In a preferred embodiment the method monitors the chromatogram during the internal recycling and product elution phases and triggers a control action based on a threshold value.

Preferably exactly two adsorbers are used in the process.

In a preferred embodiment the method comprises
(a) monitoring the slope and/or the value of the concentration-proportional signal at the outlet of the upstream adsorber during the internal recycling of the weakly adsorbing impurities (phase I1)
(b) continuously comparing the value of the concentration-proportional signal with a defined threshold value while the slope of the concentration-proportional signal is positive, and upon reaching the threshold
(c) stopping the execution of phase I1 and initiating phase B1 with phase B1 having a fixed or a variable duration dependent on another threshold.

In another preferred embodiment the method comprises
(a) monitoring the slope and/or the value of the concentration-proportional signal at the outlet of the upstream adsorber during the internal recycling of the weakly adsorbing impurities (phase I1),
(b) continuously comparing the value of concentration-proportional signal with a defined threshold value while the slope of the concentration-proportional signal is positive, and upon reaching the threshold
(c) continuing phase I1 for a period of time (delay) before stopping the execution of phase I1 and initiating phase B1 with phase B1 having a fixed duration, and with the delay having a pre-set or a variable duration that depends on another threshold.

In yet another preferred embodiment the previous method is modified such that phase B1 is initiated based on a threshold value, which may be the same or different from the threshold value used to trigger the delay period in phase I1 and wherein the delay period may be associated with a minimum value. The reason for assigning a minimum duration to the delay is to avoid premature initiation of phase B1 due to impurities eluting before the main product and reaching the value of the second threshold. The delay period may be formulated in terms of time or volume.

In a further preferred embodiment the method comprises, in addition, (a) monitoring the slope and/or the value of the concentration-proportional signal at the outlet of the product eluting adsorber (phase B1) and, (b) continuously comparing the value of the concentration-proportional signal with a defined threshold value while the slope of the concentration-proportional signal is negative, and upon reaching the threshold (c) stopping the execution of phase B1 and initiating phase I2, wherein the sample loading is modulated such that the sample load is taking place at the beginning of phase B1 and stopped after a short period of time while the elution of the other adsorber is ongoing until the threshold is reached, and with I2 having a pre-set or a variable duration that depends on another threshold.

In another preferred embodiment the end point of I2 is determined by a threshold value wherein, as this threshold is reached, (c) the execution of phase I2 is stopped and phase B2 is initiated.

In other preferred embodiments, any of above methods related to the initiation of phase B1 are combined with methods related to the termination of phase B1.

So also combinations of these methods are possible with initiation of the delay period within I1 based on a first threshold, initiation of the product collection phase B1 based on a second threshold while the slope of the UV signal is positive and termination of phase B1 (and initiation of phase I2) based on a third threshold.

Other preferred embodiments of any of the above methods use additional information of the slope of the chromatogram to trigger control actions. In a preferred embodiment of method, the above methods that use a delay volume with fixed duration instead may use a change in sign of the slope as criterion to stop the delay and to continue to evaluate the signal for reaching the second threshold.

All methods may include continuing running and extending the elution gradient through phases I1, B1, I2, preferably at the gradient slope used during the elution of components "W" (phase 4 in a setup with two adsorbers), regarding the slope with respect to volume of mobile phase used in the process. This means that the elution gradient of the multi-adsorber process has a constant slope with respect to volume of mobile phase used in the process over the phases I1, B1, I2.

In the described methods thresholds may also be defined based on information obtained during the same run or cycle, thus they may not be known when a run or cycle is started. In that case a first cycle may be run partially or completely before the method determines threshold values based on evaluation of the recorded signals valid for the remainder of the cycle (in case the cycle has been partially completed at the time of evaluation) or for the remainder of the run of the chromatographic process. Thus, the threshold for stopping a phase of the process and initiating a new phase of the process is defined in relation to the concentration-proportional signal recorded during the same or a previous run of the chromatographic process.

The proposed method also includes triggering a control action based on failing to reach a defined threshold within a specified elution volume. This can occur, for instance if the chromatogram fails to elute because one of the pumps used in the chromatographic process is not working properly. A preferred action is stopping the pumps used for delivering the mobile phase. Reference values can be obtained from the design chromatogram.

In preferred embodiments the concentration-proportional signal is based on visible light, UV, infrared, fluorescence, Raman, ionic strength, conductivity or refractive index measurement.

In the above method description, durations are made in terms of time or volume. Time t and volume V can be converted one into the other using the volumetric flow rate Q used in the corresponding phase using $V=Q*t$. Also the slope of the concentration-proportional signal can be defined with respect to volume or time.

Further embodiments of the invention are laid down in the dependent claims. The term "solvents" in this invention also includes buffers and other types of mobile phases. The term "adsorber" in this invention includes packed bed chromatography columns or other devices containing a chromatographic stationary phase, including membranes, fiber-based adsorbents and monolithic adsorbents.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
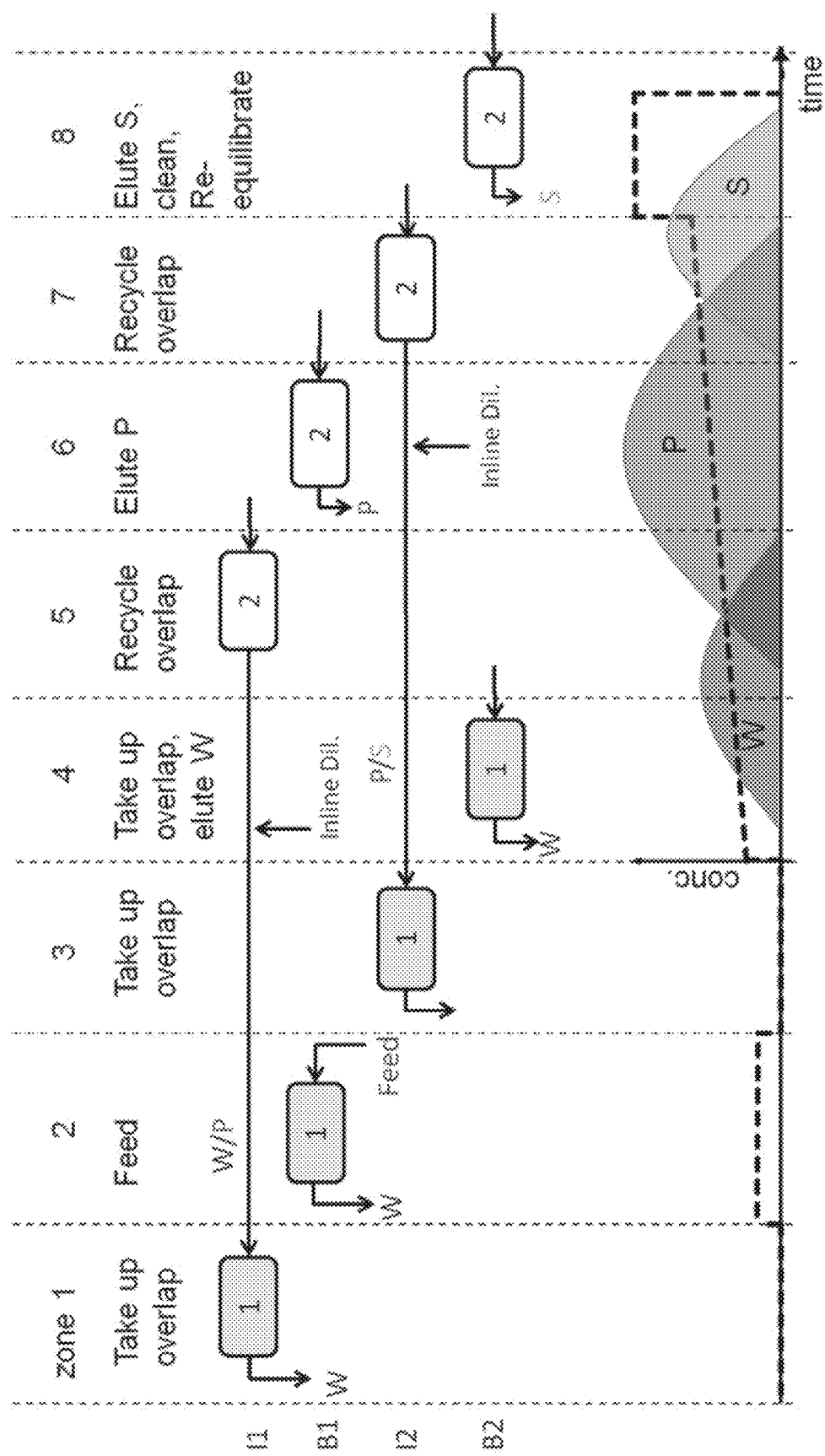
FIG. 1 shows a schematic of an MCSGP process, specifically it is an illustration of the first half-cycle ("switch") of a twin-adsorber counter-current solvent gradient purification (MCSGP) process; the dashed vertical lines separate the different MCSGP process tasks corresponding to the zones of the schematic batch chromatogram shown in the lower part of the figure; phases I1, B1, I2, B2 are carried out sequentially.

The process principle of two-adsorber (e.g. having two chromatographic columns or membrane adsorbers) MCSGP is shown in FIG. 1. The schematic chromatogram at the bottom of FIG. 1 represents a batch chromatogram that has been divided into different sections (vertical dashed lines) according to the tasks that are carried out in the batch chromatography run (equilibration in zone 1, feeding in zone 2, washing in zone 3, elution in zones 4-7, cleaning and re-equilibration in zone 8). The elution phase is subdivided into additional zones according to the elution order of weakly adsorbing impurities (W), product (P) and strongly adsorbing impurities (S) in the chromatogram (elution of W in zone 4, elution of the overlapping part W/P in zone 5, elution of pure P in zone 6, elution of the overlapping part of P/S in zone 7). In the two-adsorber MCSGP process these individual tasks of zones 4-7 are carried out as in batch chromatography, with the decisive difference that the W/P and the P/S eluate are directed to a second adsorber for recovery of P (zones 5 and 7). Thus the process tasks of the single adsorber batch process and the MCSGP process are analogous and it is possible to derive the operating parameters for MCSGP from the batch operating parameters and the corresponding chromatogram.

A complete cycle of a two-adsorber MCSGP process comprises two "switches" with four pairs of tasks each (I1, B1, I2, B2) as illustrated in FIG. 1. The phases in each switch are identical; the difference is only in the adsorber position: In the first switch, adsorber 1 is downstream of adsorber 2 while in the second switch (not shown in FIG. 1) adsorber 2 is downstream of adsorber 1. The four phases include the following tasks:

Phase I1: First interconnected phase. The overlapping part W/P is eluted from the upstream adsorber (zone 5 in FIG. 1), and internally recycled in interconnected mode into the downstream adsorber (zone 1). In between the adsorbers, the stream is normally diluted inline with buffer/solvent to re-adsorb P (and overlapping W) in the downstream adsorber. At the end of phase I1, pure product is ready for elution at the outlet of the upstream adsorber (zone 5).

In FIG. 28 of EP-A-1 877 769, this phase is referred to step "1."

Phase B1: First batch phase. Pure P is eluted and collected from the adsorber in zone 5 (adsorber 2 in FIG. 1), keeping the overlapping part P/S and S in the adsorber. At the same time, fresh feed is injected into the adsorber in zone 2.

In FIG. 28 of EP-A-1 877 769, this phase is referred to as step "2."

Phase I2: Second interconnected phase. The overlapping part P/S is eluted from the upstream adsorber (zone 7), and internally recycled into the downstream adsorber (zone 3). In between the adsorbers, the stream is normally diluted in-line with buffer/solvent to re-adsorb P in the downstream adsorber. At the end of the step, all remaining P has been eluted from the upstream adsorber and only S is left in the upstream adsorber.

In FIG. 28 of EP-A-1 877 769, this phase is referred to step "3."

Phase B2: Second batch phase. The adsorber in zone 8 (adsorber 2 in FIG. 1) is cleaned to remove S and re-equilibrated. At the same time, W is eluted from the other adsorber in zone 4.

In FIG. 28 of EP-A-1 877 769, this phase is referred to step "4."

After having completed these tasks, the adsorbers switch positions and in the next phase I1 (not shown in FIG. 1), adsorber 2 is in the downstream position (zone 1) and adsorber 1 is in the upstream position (zone 5). At the beginning of this I1 phase, adsorber 2 is cleaned and re-equilibrated and ready for uptake of the W/P fraction from adsorber 1. After having completed B1, I2, and B2 for the second time the adsorbers return to their original positions and one cycle has been completed. Adsorber 1 is now clean and ready for uptake of W/P from adsorber 2 in the next phase I1 (as shown in FIG. 1).

As in other counter-current chromatographic processes, in practice in MCSGP the adsorber movement is simulated by connecting and disconnecting adsorber inlets and outlets through valve switching and not by physical movement of the adsorbers.

The process design of such multi-adsorber counter-current processes relies on dividing a "design chromatogram", such as illustrated in FIG. 1, showing the elution of product and impurity compounds, essentially into a number of different zones. Crucial to process design are a first zone where the weakly adsorbing impurities are present alone (zone 4 in FIG. 1), a second zone wherein the weakly adsorbing impurities W are overlapping with the product compound P (zone 5 in FIG. 1), a third zone where the pure product P is present (zone 6 in FIG. 1), a fourth zone wherein the product P and the strongly adsorbing impurities S are overlapping (zone 7 in FIG. 1) and a fifth zone wherein the strongly adsorbing impurities S are present alone (zone 8 in FIG. 1).

As part of the process design, the borders between the different zones have to be positioned leading to determination of the process operating parameters (gradient concentrations, pump flow rates) from the single adsorber batch chromatogram. The positioning of the borders is done based on elution volume, which is linked and can be converted to time via the volumetric flow rate. The positioning of the borders is critical to process performance, i.e. to product purity and productivity. For instance, misplacing the border of the product elution zone (zone 6 in FIG. 1) may lead to inclusion of weakly adsorbing impurities in the product pool and failure to meet the purity specifications.

However, even if properly designed initially, external factors may have a detrimental effect on product purity and process performance of the described multi-adsorber countercurrent process at a later stage. Freshly prepared mobile phases may have a slightly different composition; environmental temperatures may vary, influencing the chromatographic adsorption process. The stationary phase capacity may change over time.

In most cases these factors lead to a shift of the chromatographic profile while resolution of product and impurities remains similar. However the shifted chromatogram may have different peak positions compared to the original design chromatogram that was used to design the multi-adsorber countercurrent process.

This means that the positioning of the borders between the different zones relying on the original design chromatogram is not accurate anymore and the product purity may suffer as result of the shifted peaks.

Figure 2:
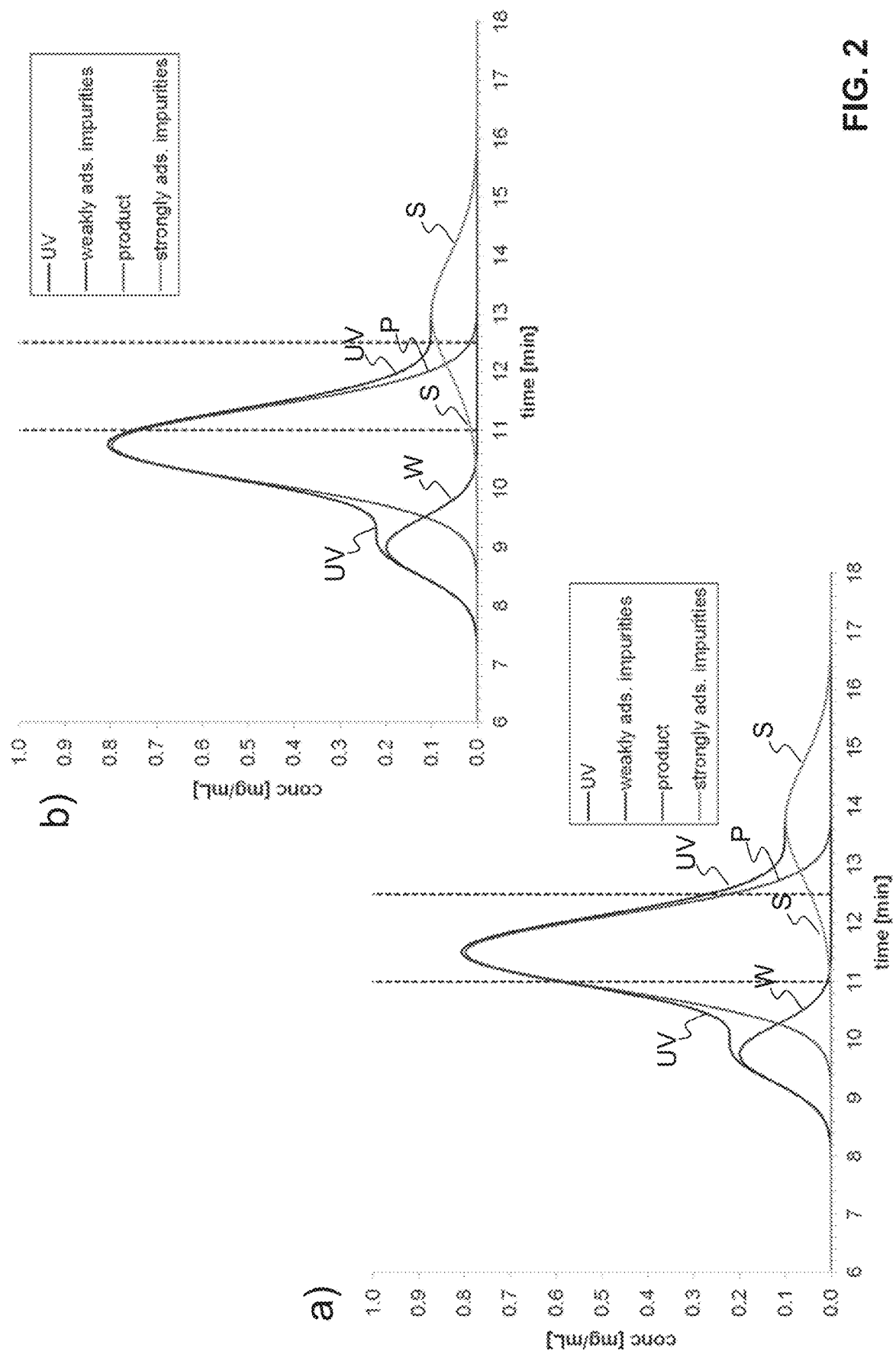
FIG. 2 shows in a) a chromatogram in which zone 6 is properly located; and in b) a chromatogram in which zone 6 is shifted detrimentally to include strongly adsorbing impurities; specifically schematic chromatograms of a single product elution from MCSGP run are given with a rigid product elution window position, without control method; a) shows the run under optimal operating conditions with the product peak being collected and most of the impurities being excluded from the product pool; b) shows the run with the chromatogram having shifted to earlier elution times, resulting in product with lower concentration and purity.

An example is shown in FIG. 2: While the product collection window is placed optimally (FIG. 2a), in case of an earlier elution of the chromatogram by just about 1 min, the product elution interval of zone 6 (that has a fixed position based on the original), misses the product peak maximum and includes a major part of the strongly adsorbing impurities (FIG. 2b). As a result, the product concentration in the collected fraction and, more importantly, the purity drops, such that the product may not meet purity specifications anymore. A shift of 1 min could be caused by a change of temperature by a few degrees Celsius.

Note that usually only a cumulative concentration-proportional signal can be recorded by the detector, for example a cumulative UV signal (thick black line, UV). To visualize the inclusion of impurities in the product pool, the cumulative concentration-proportional signal was deconvoluted numerically to show product and impurity peaks.

In order to account for change in environmental conditions, a new design chromatogram must be recorded for each new condition which can only be completed with extreme experimental effort and practically does not make sense.

One way of adding safety to the process design is to narrow the product fraction (zone 6), leading to increase the width of the zones for internal recycling (zones 5 and 7), but this has a negative impact on the productivity of the process and can only be done if the shift of the chromatogram is significantly smaller than the width of the elution window. A more preferable way to account for variations in operating parameters is to use online control.

One possibility is to use the evaluation of the peak maximum position or the 1st moment of the peak to derive control actions for the next product elution or the next cycle.

Another possibility is to use the evaluation of the product eluate by at-line HPLC to determine yield and purity.

These control methods for MCSGP use sophisticated control algorithms capable of controlling and optimizing the process based on a cycle-to-cycle. The advantage of the control methods is their capability of simultaneously performing process control and process optimization. Their drawback lies in the delayed effect of the control actions which become effective earliest for the subsequent product elution as the methods require information on the complete product elution phase before being capable of deriving a control action. Another drawback is the requirement of offline analytics and the complexity of the control algorithms. Generally the control algorithms evaluate the product elutions to determine an actual value related to process performance and/or product purity and calculate an error based on the difference between the actual value and a set point value. A control action is then elicited based on the magnitude of the error.

Other methods aim at describing the MCSGP process using a chromatographic model and use the model to predict process performance and perform optimization (model-based-predictive control). Although being powerful, these methods are difficult to apply in practice as they need an accurate description of the process and the chromatographic separation based on a number of parameters related to the compounds to be separated and to the chromatographic stationary and mobile phases to be used, which are difficult and time-consuming to determine and they require significant modelling know-how.

Figure 3:
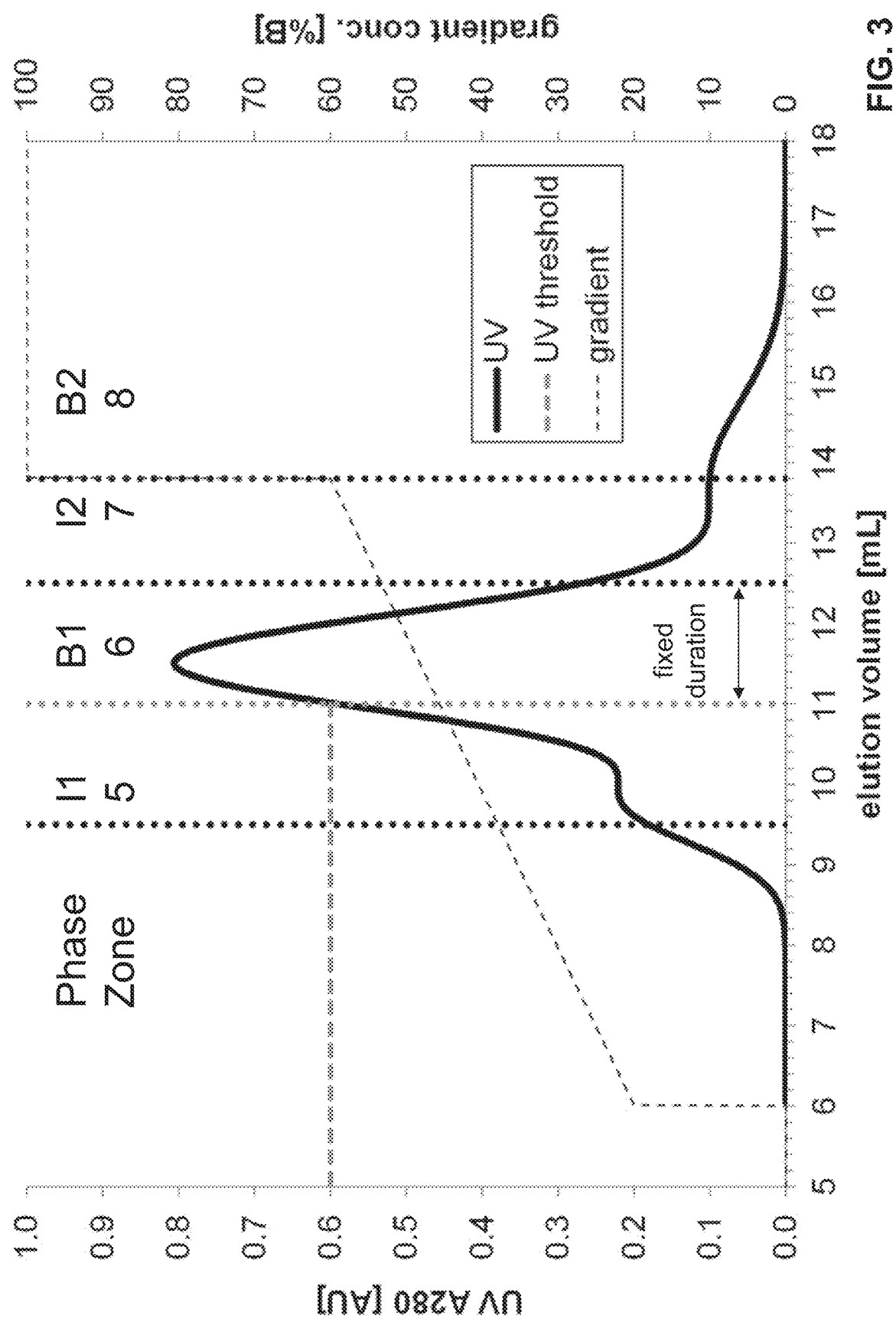
FIG. 3 shows a schematic of a control method (A) based on an MCGSP chromatogram showing a single product elution from one of the two adsorbers and the phases I1, B1, I2 and B2.

FIG. 3 shows the chromatogram using a method comprising
(a) monitoring the slope and/or the value of the concentration-proportional signal at the outlet of the upstream adsorber during the internal recycling of the weakly adsorbing impurities (phase I1)
(b) continuously comparing the value of the concentration-proportional signal with a defined threshold value while the slope of the concentration-proportional signal is positive, and upon reaching the threshold
(c) stopping the execution of phase I1 and initiating phase B1 with phase B1 having a fixed or a variable duration dependent on another threshold.

In this case the concentration-proportional signal is the UV signal and the UV threshold is 0.6 AU and the fixed duration of B1 is 1.5 mL.

Figure 4:
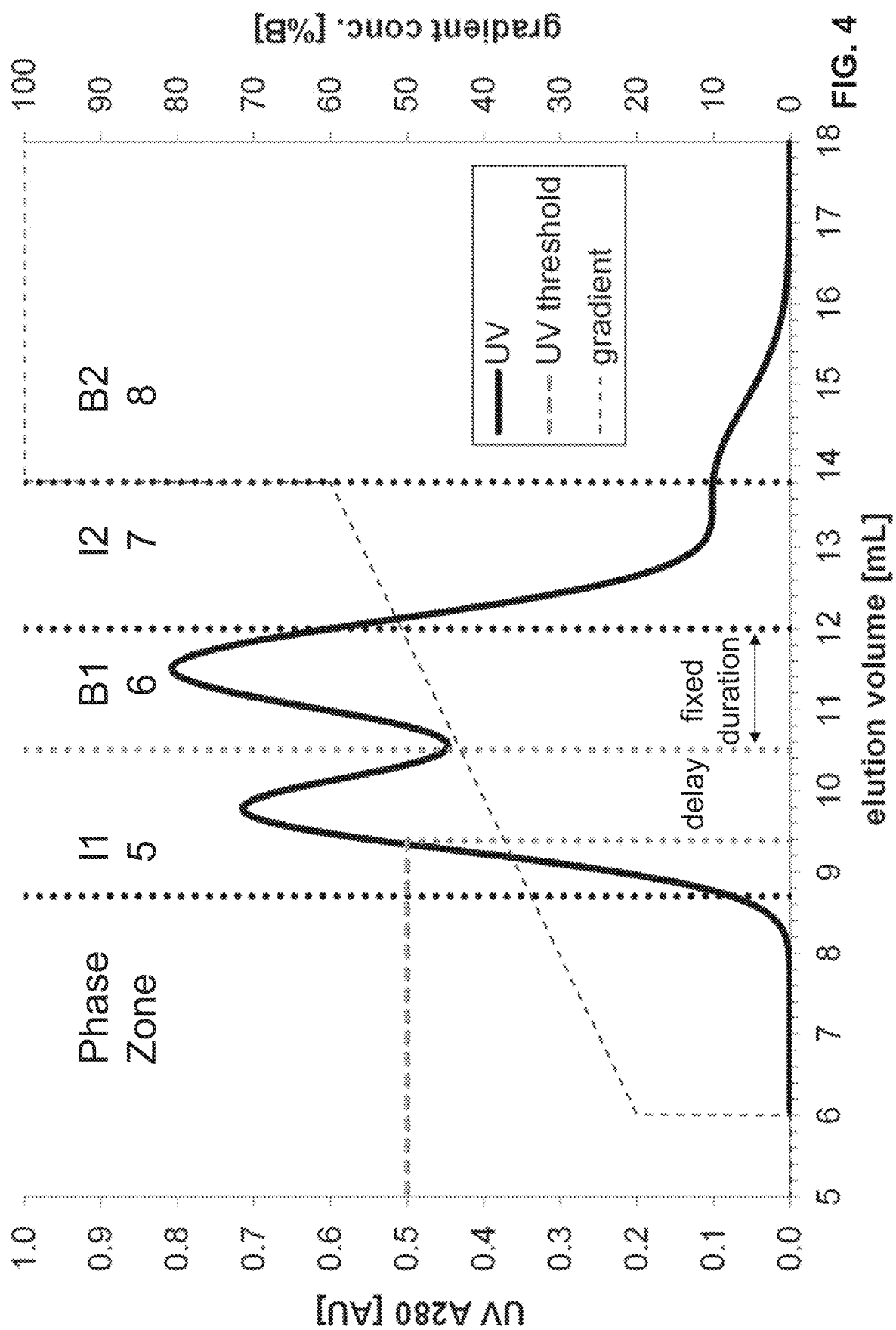
FIG. 4 shows a schematic of a control method (B) based on an MCGSP chromatogram showing a single product elution from one of the two adsorbers and the phases I1, B1, I2 and B2.

FIG. 4 shows the chromatogram using a method comprising
(a) monitoring the slope and/or the value of the concentration-proportional signal at the outlet of the upstream adsorber during the internal recycling of the weakly adsorbing impurities (phase I1),
(b) continuously comparing the value of concentration-proportional signal with a defined threshold value while the slope of the concentration-proportional signal is positive, and upon reaching the threshold
(c) continuing phase I1 for a period of time or elution volume (delay) before stopping the execution of phase I1 and initiating phase B1 with phase B1 having a fixed duration, and with the delay having a pre-set or a variable duration that depends on another threshold.

In this example the following holds true: The concentration-proportional signal is the UV signal, threshold 0.5 AU, delay volume 1.1 mL, B1 product collection (fixed) 1.5 mL.

Figure 5:
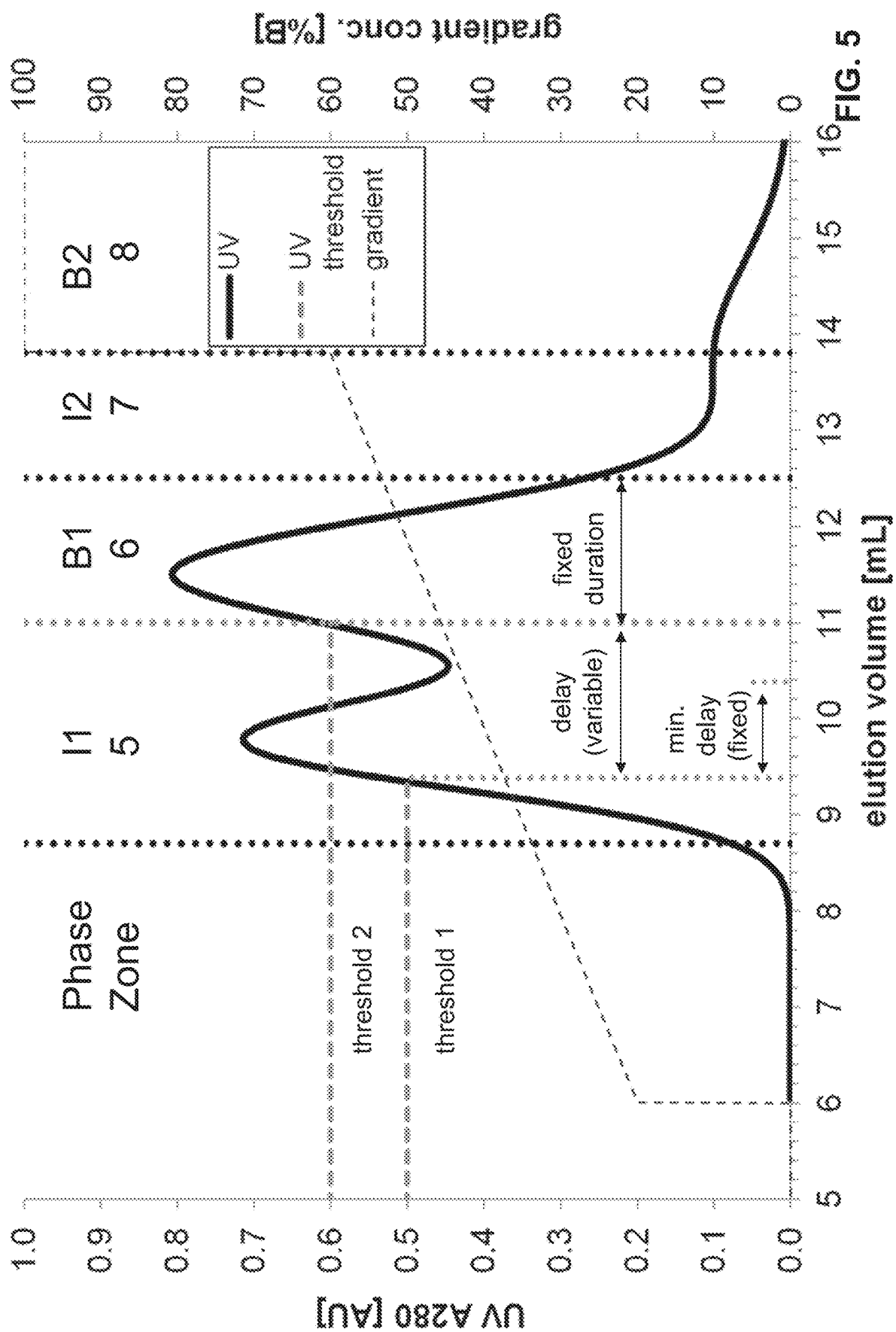
FIG. 5 shows a schematic of a control method (C) based on an MCGSP chromatogram showing a single product elution from one of the two adsorbers and the phases I1, B1, I2 and B2.

FIG. 5 shows the chromatogram using a method with a modification of the previous method such that phase B1 is initiated based on a threshold value, which may be the same or different from the threshold value used to trigger the delay period in phase I1 and wherein the delay period may be associated with a minimum value. The reason for assigning a minimum duration to the delay is to avoid premature initiation of phase B1 due to impurities eluting before the main product and reaching the value of the second threshold. The delay period may be formulated in terms of time or volume. In this example the following holds true: The concentration-proportional signal is the UV signal, threshold 1: 0.5 AU, minimum delay period 1.0 mL, threshold 2: 0.6 AU, product collection (fixed) 1.5 mL.

Figure 6:
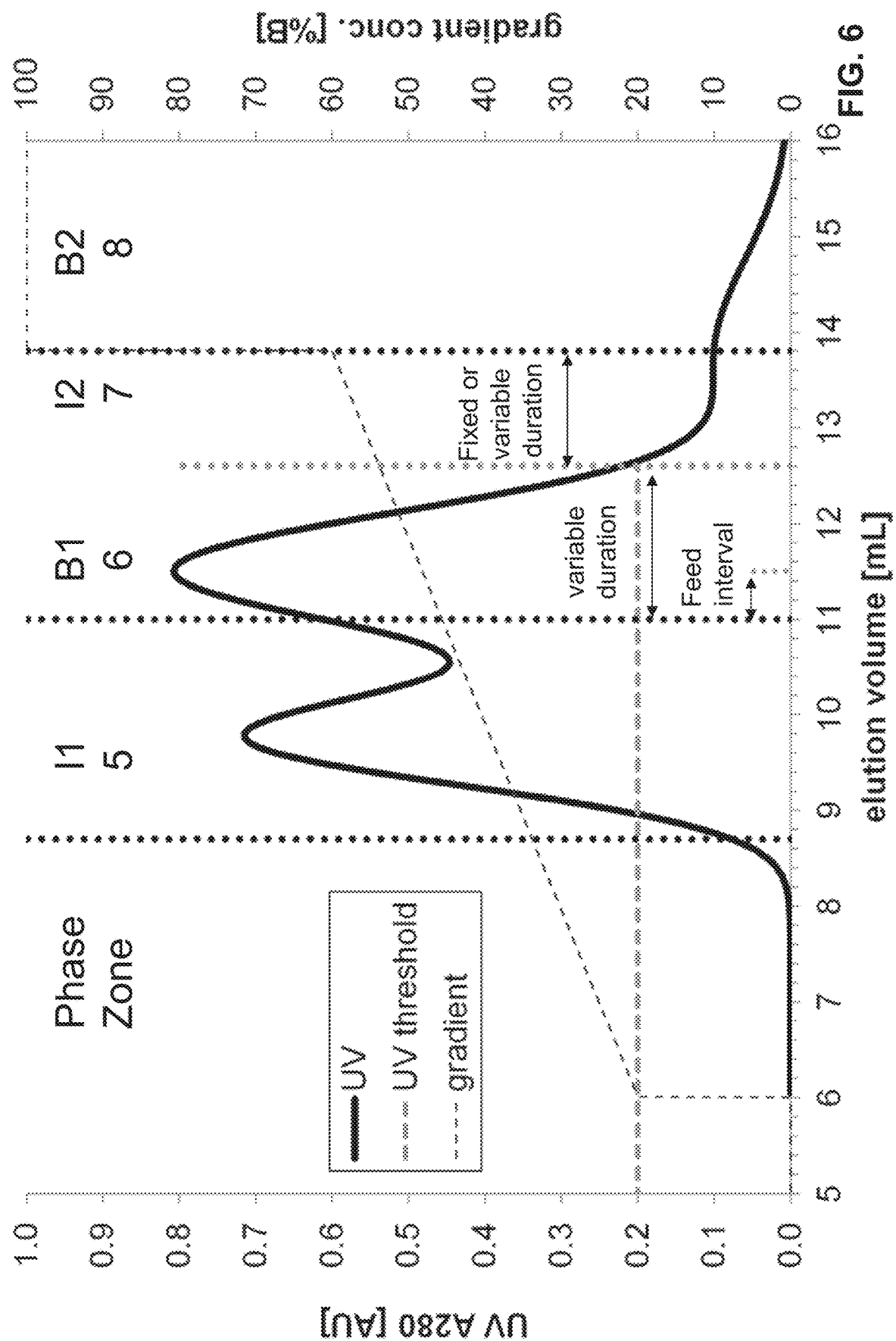
FIG. 6 shows a schematic of a control method (D) based on an MCGSP chromatogram showing a single product elution from one of the two adsorbers and the phases I1, B1, I2 and B2.

FIG. 6 shows the chromatogram using a method comprising
(a) monitoring the slope and/or the value of the concentration-proportional signal at the outlet of the product eluting adsorber (phase B1) and, (b) continuously comparing the value of the concentration-proportional signal with a defined threshold value while the slope of the concentration-proportional signal is negative, and upon reaching the threshold (c) stopping the execution of phase B1 and initiating phase I2, wherein the sample loading is modulated such that the sample load is taking place at the beginning of phase B1 and stopped after a short period of time while the elution of the other adsorber is ongoing until the threshold is reached, and with I2 having a pre-set or a variable duration that depends on another threshold.

Here, the concentration-proportional signal is the UV signal, the threshold is 0.2 AU, fixed feed interval duration 0.5 mL, fixed duration of I2 phase 1.2 mL.

Figure 7:
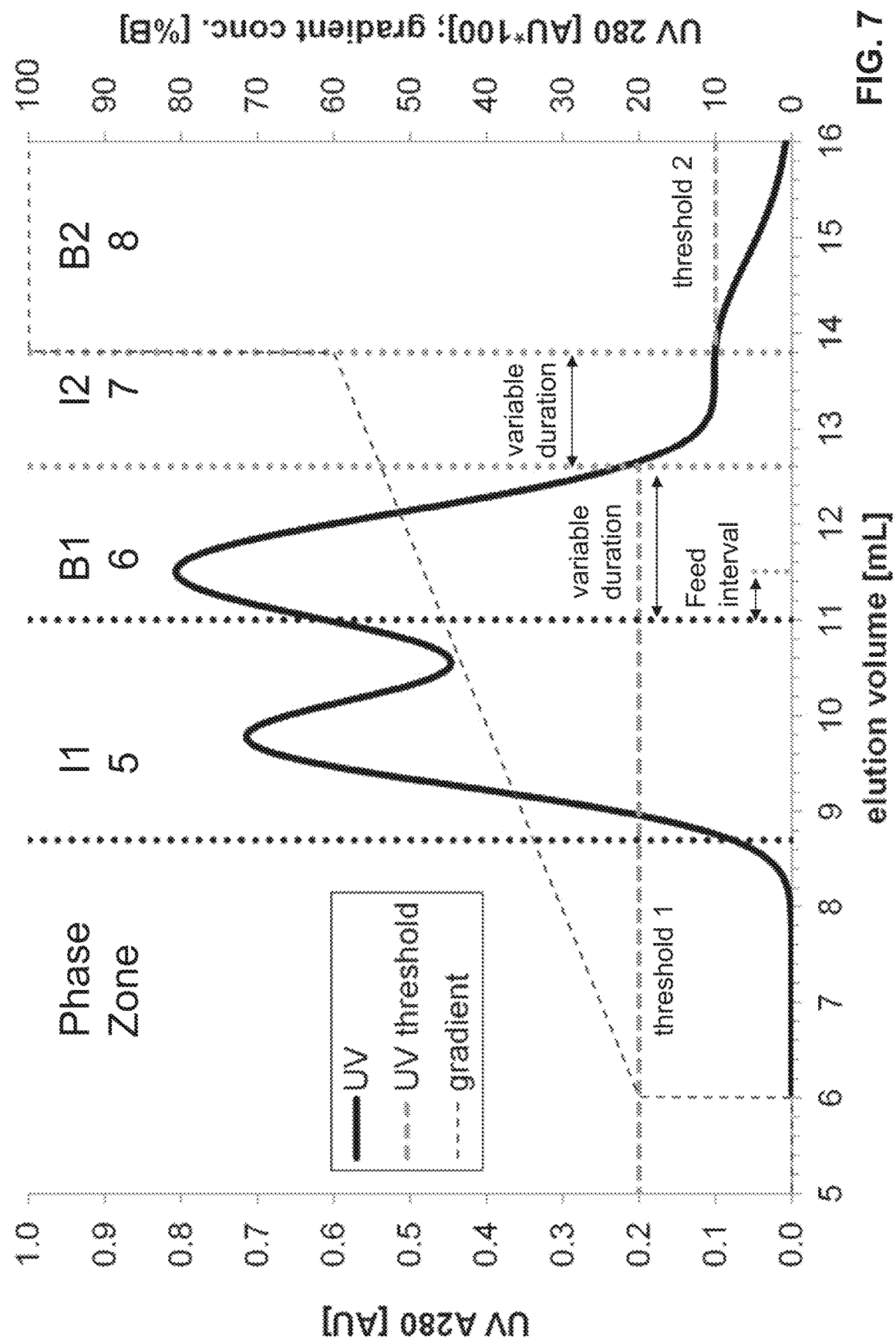
FIG. 7 shows a schematic of a control method (E) based on an MCGSP chromatogram showing a single product elution from one of the two adsorbers and the phases I1, B1, I2 and B2.

FIG. 7 shows the chromatogram using a method where the end point of I2 is determined by a threshold value wherein, as this threshold is reached, (c) the execution of phase I2 is stopped and phase B2 is initiated. Here, the concentration-proportional signal is the UV signal, threshold 1 for start of I2: 0.2 AU, fixed feed interval duration 0.5 mL, threshold 2 for end of I2: 0.1 AU.

Any of above methods related to the initiation of phase B1 can be combined with methods related to the termination of phase B1.

Figure 8:
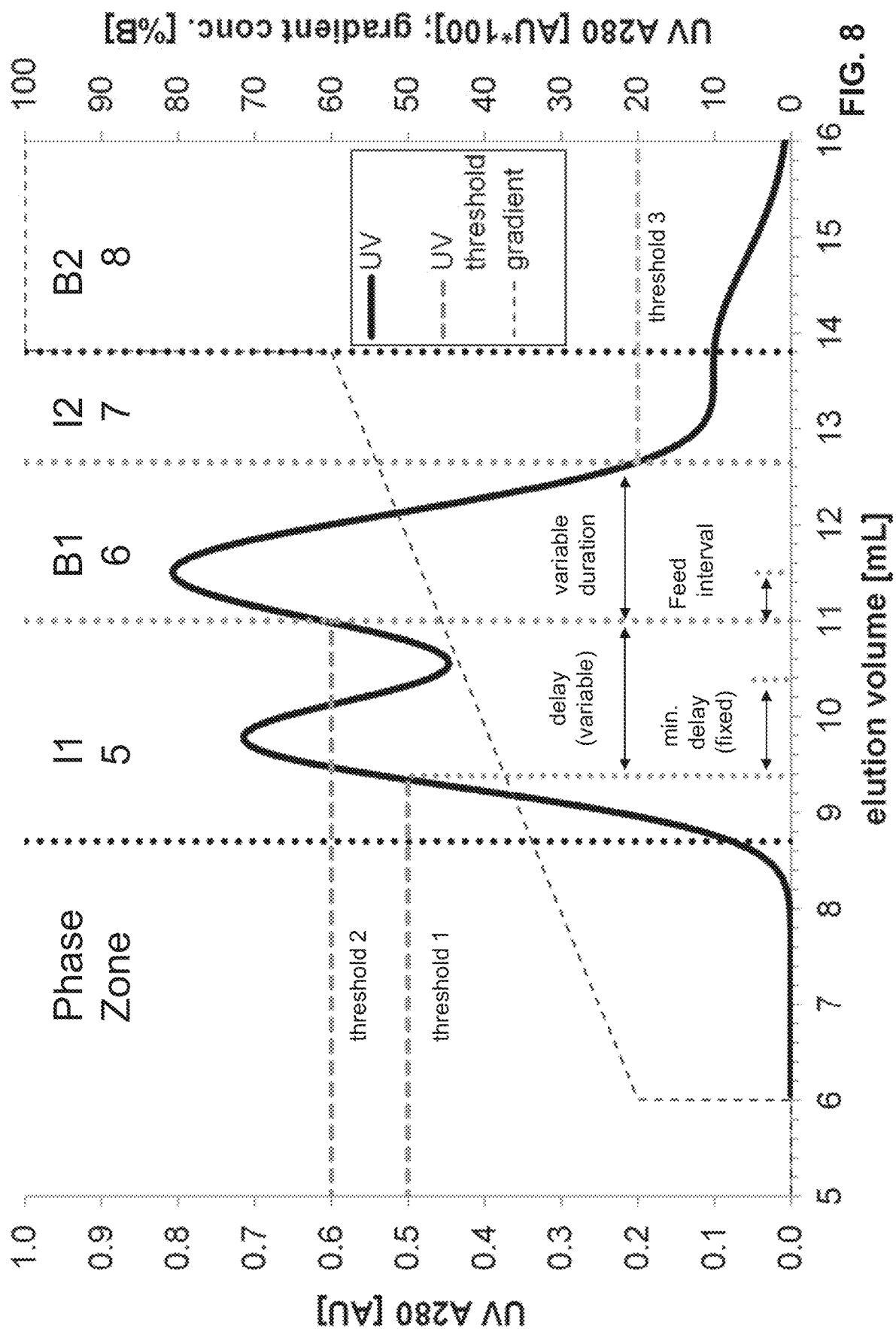
FIG. 8 shows a schematic of a control method (F) based on an MCGSP chromatogram showing a single product elution from one of the two adsorbers and the phases I1, B1, I2 and B2.

FIG. 8 shows a combination of the methods referring to FIGS. 5 and 6 with initiation of the delay period within I1 based on a first threshold, initiation of the product collection phase B1 based on a second threshold while the slope of the UV signal is positive and termination of phase B1 (and initiation of phase I2) based on a third threshold.

In other preferred embodiments of any of the above methods uses additional information of the slope of the chromatogram to trigger control actions. In a preferred embodiment of method, the above methods that use a delay volume with fixed duration instead may use a change in sign of the slope as criterion to stop the delay and to continue to evaluate the signal for reaching the second threshold.

All methods include continuing running and extending the elution gradient through phases I1, B1, I2, preferably at the gradient slope used in phase 4 during the elution of compound "W", regarding the slope with respect to volume of mobile phase used in the process. This means that the elution gradient of the multi-adsorber process has a constant slope with respect to volume of mobile phase used in the process over the phases I1, B1, I2, as illustrated in FIGS. 3-8.

In the described methods thresholds may also be defined based on information obtained during the same run or cycle, thus they may not be known when a run or cycle is started. In that case a first cycle may be run partially or completely before the method determines threshold values based on evaluation of the recorded signals valid for the remainder of the cycle (in case the cycle has been partially completed at the time of evaluation) or for the remainder of the run of the chromatographic process. Thus, the threshold for stopping a phase of the process and initiating a new phase of the process is defined in relation to the concentration-proportional signal recorded during the same or a previous run of the chromatographic process. As an example, the method monitors the UV signal during the operation of an MCSGP chromatographic run. The method has been configured such that it stops phase B1 and imitates phase I2 as soon as it has reached 25% of the UV maximum value to be obtained during phase B1. During phase B1 a peak with maximum peak value of 0.80 AU elutes (see FIG. 6). As soon as the method reaches 25% of the maximum peak value, corresponding to 0.20 AU, phase B1 is stopped and the process continues with phase I2. In the subsequent cycle, during phase B1, the maximum peak value may only reach 0.72 AU (e.g. due to variations in adsorber quality). With method being configured to act when reaching 25% of the peak maximum value reached during phase B1, the process would continue until reaching a threshold of 0.18 AU whereupon the phase B1 would be stopped and phase I2 would be initiated. This type of method configuration relating a threshold to a concentration-proportional value obtained previously during the run, allows balancing variations in adsorber quality or detector quality or detector calibration. The method also includes using the number of peaks counted in the chromatogram to trigger a control action.

Figure 9:
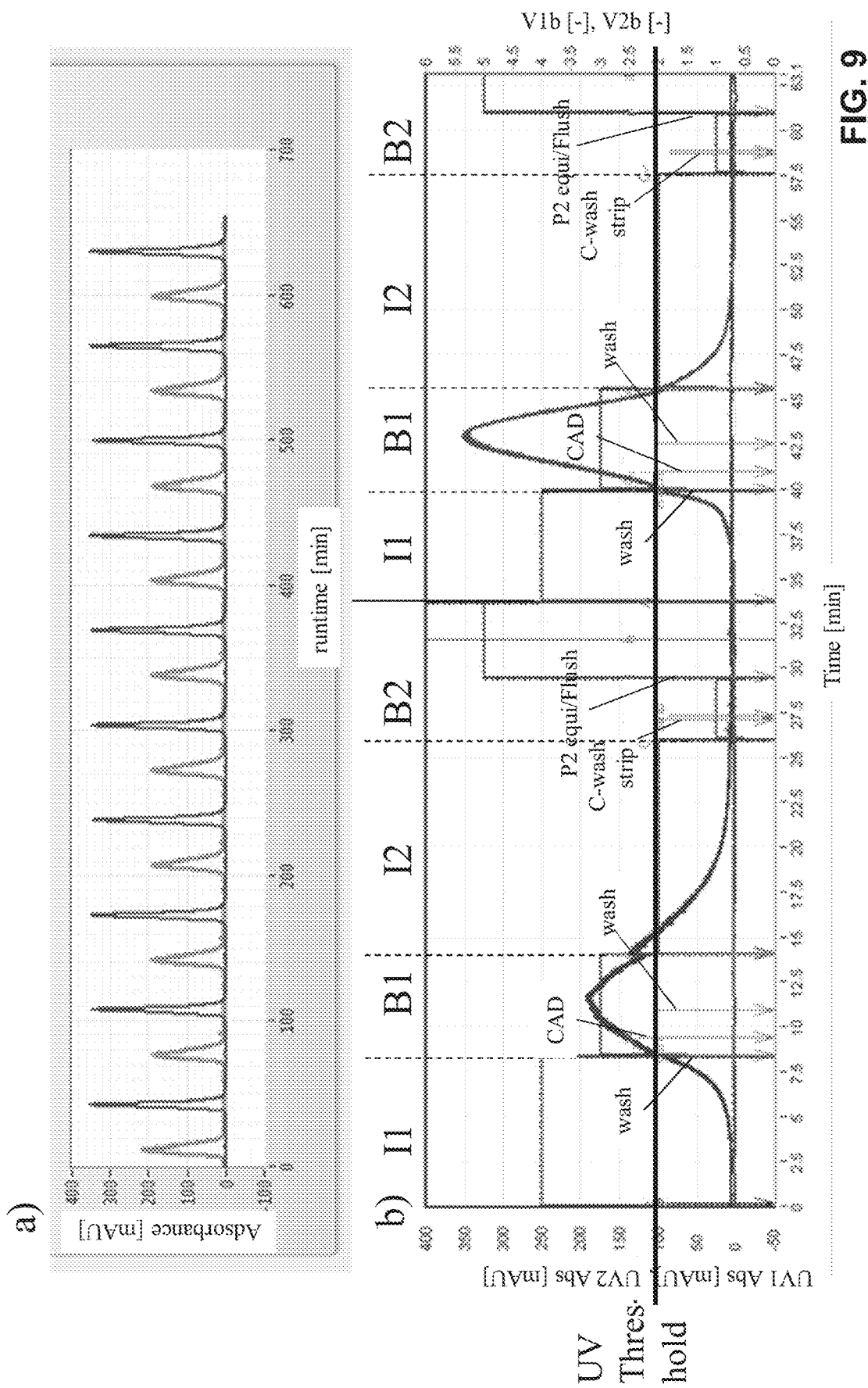
FIG. 9 shows in a) a chromatograms of 10 cycles of an MCSGP run operated with two different adsorbers; in b) superimposed chromatograms of aforementioned 10 cycles indicate the threshold value at 100 mAU and showing the phases I1, B1, I2 and B2.

Example 1 [FIG. 9]

A Contichrom system (ChromaCon AG) was operated using control method (A). Two columns, packed with different cation exchange stationary phases (Fractoprep SO3 (M) and Gigacap SO3) packed into columns of 0.5 cm inner diameter and 10 cm bed height. The two different resins were used to simulate columns with different column packing quality. The operating software of the system was programmed to continuously monitor the A280 UV signal at both column outlets and the UV threshold for starting the product collection phase was set to 0.1 AU (=100 mAU) based on knowledge of the design chromatogram.

The duration of the product elution phase was fixed to 5.5 min.

The load material was a Lysozyme solution and the buffers used were buffer A: 25 mM Phosphate, pH 6.0; buffer B: 25 mM Phosphate, pH 6.0, IM NaCl; Cleaning solution: IM NaOH. FIG. 9A shows the chromatograms of the cyclic operation of the MCSGP process over 10 cycles with the repetitive product elution peaks from each column. It can be seen that the product peaks have very different width and height (Fractoprep broad peaks, Gigacap narrow peaks), depending on which column they elute from. FIG. 9B shows an overlay of the chromatograms of the 10 cycles and confirms that the product elutions from each column are very reproducible compared among the product elutions from the same column. Moreover the figure shows the outlet valve position that is utilized (V1b, V2b), which is representative of the process phases. Valve position 4 corresponds to phase I1, position 3 to phase B1, position 4 to phase I2 and positions 1 and 5 correspond to phase B2.

The chromatograms show that despite the very different peak shapes the product collection is initiated at the set threshold of 0.1 AU and that the product collection is operating with a fixed duration, collecting the peaks maximum in both cases which corresponds to the highest product concentration and purity.

Figure 10A:
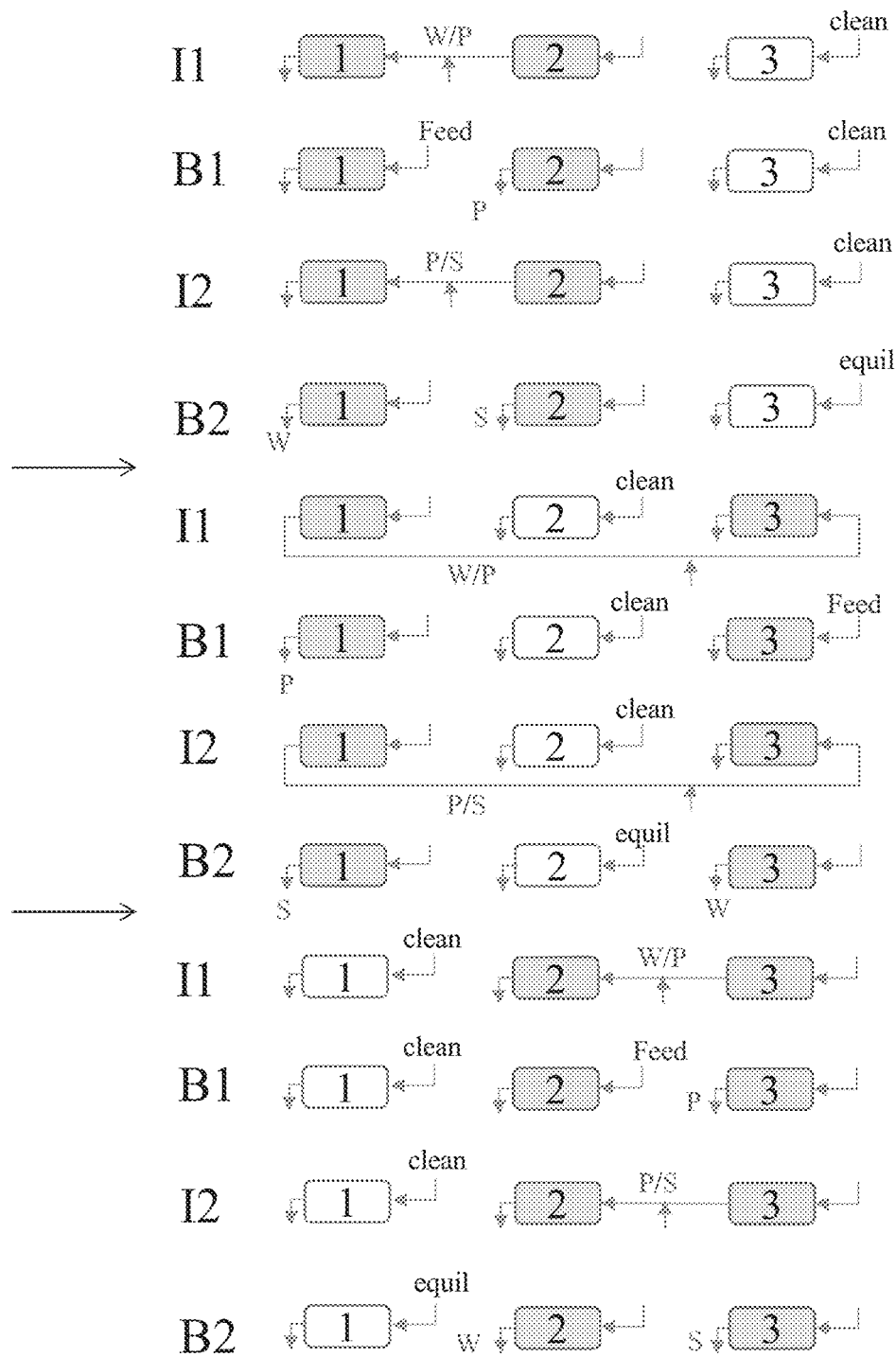
FIG. 10 shows a schematic of a process according involving 3 adsorbers (a) and one involving 4 adsorbers (b). The adsorbers involved in the control method are highlighted in grey, whereas adsorbers carrying out other tasks such as cleaning, an equilibration or a reaction step are not highlighted.
Figure 10B:
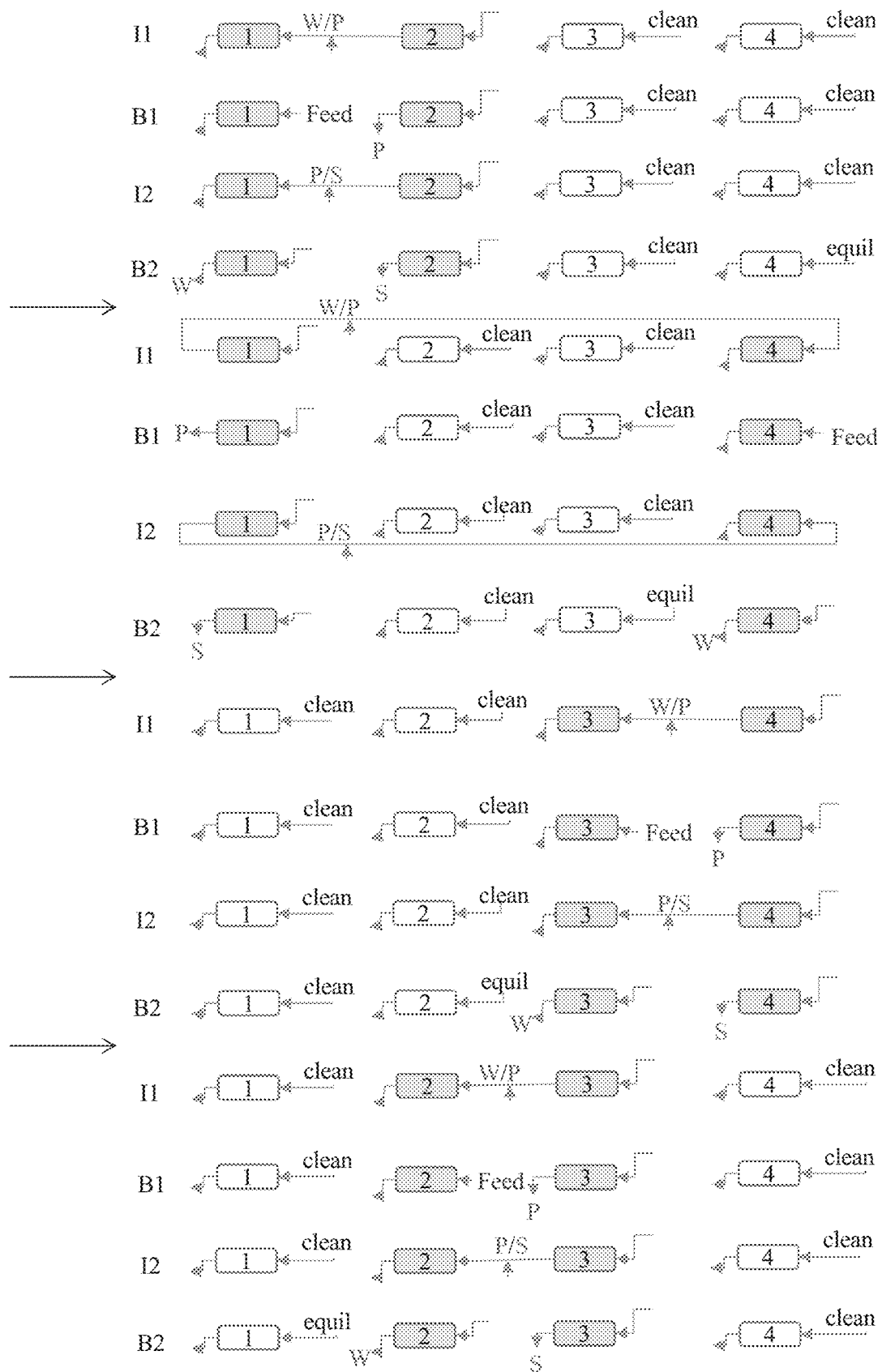

FIG. 10 shows a schematic of a process similar to the one illustrated in FIG. 1, wherein in a) a setup involving 3 adsorbers is shown and in b) a setup involving 4 adsorbers.

In a) with the 3 adsorbers the upper four lines from I1 to B2 essentially correspond, in as far as the tasks of adsorbers 1 and 2 is concerned, to the process as illustrated in FIG. 1. Adsorber 3 is passive in as far as the actual separation process involving components W (weakly adsorbing fraction), P (product fraction) and S (strongly adsorbing fraction) is concerned. The column 3 can be subject to cleaning, equilibration or reaction steps in that first block.

Upon transition to the second block I1-B2 (transition illustrated by the upper arrow from the left) adsorber 1 of the first block takes over the function of adsorber 2 in the first block, adsorber 2 of the first block takes over the function of adsorber 3 in the first block (passive function), and adsorber 3 of the first block takes over the function of adsorber 1 in the first block.

Upon transition to the third block I1-B2 (transition illustrated by the lower arrow from the left) adsorber 1 takes over the function of adsorber 3 in the first block (passive function), adsorber 2 takes over the function of adsorber 1 in the first block, and adsorber 3 takes over the function of adsorber 2 in the first block.

Concentration proportional signals can be measured in that three-adsorber process in FIG. 10 a at the outlet of the active columns, so in the first block from the top at the outlet of columns 1 and 2 (as detailed in the description of FIG. 1), in the second block from the top analogously at the outlet of columns 1 and 3, and at the bottom block analogously at the outlet of columns 2 and 3. Preferably, just the concentration proportional signal at the outlet of the upstream adsorber of the two active ones in interconnected mode (I1, I2) is measured, and in the batch phase of the one eluting the product (B1), so e.g. at the outlet of adsorber 2 in steps 1-4 (first block), at the outlet of adsorber 1 in steps 5-8 (second block) and at the outlet of adsorber 3 in steps 9-12 (block 3).

In FIG. 10 b with the 4 adsorbers the upper four lines from I1 to B2 essentially correspond, in as far as the tasks of adsorbers 1 and 2 is concerned, to the process as illustrated in FIG. 1. Adsorbers 3 and 4 are passive in as far as the actual separation process involving components W (weakly adsorbing fraction), P (product fraction) and S (strongly adsorbing fraction) is concerned. The adsorbers 3 and 4 can be subject to cleaning, equilibration or reaction steps in that first block.

Upon transition to the second block I1-B2 (transition illustrated by the upper arrow from the left) adsorber 1 of the first block takes over the function of adsorber 2 in the first block, adsorber 2 of the first block takes over the function of adsorber 3 in the first block (passive function), adsorber 3 of the first block takes over the function of adsorber 4 in the first block (passive function), and adsorber 4 of the first block takes over the function of adsorber 1 in the first block.

Upon transition to the third block I1-B2 (transition illustrated by the middle arrow from the left) adsorber 1 takes over the function of adsorber 3 in the first block (passive function), adsorber 2 takes over the function of adsorber 4 in the first block (passive function), adsorber 3 takes over the function of adsorber 1 in the first block and adsorber 4 takes over the function of adsorber 2 in the first block.

Upon transition to the fourth block I1-B2 (transition illustrated by the lower arrow from the left) adsorber 1 takes over the function of adsorber 4 in the first block, adsorber 2 takes over the function of adsorber 1 in the first block, adsorber 3 takes over the function of adsorber 2 in the first block and adsorber 4 takes over the function of adsorber 3 in the first block.

Concentration proportional signals can again be measured in that four-adsorber process in FIG. 10 b at the outlet of the active adsorbers, so in the first block from the top at the outlet of adsorbers 1 and 2 (as detailed in the description of FIG. 1), in the second block from the top analogously at the outlet of adsorbers 1 and 4, in the third block at the outlet of adsorbers 3 and 4 and at the bottom block analogously at the outlet of adsorbers 2 and 3. Again preferably, just the concentration proportional signal at the outlet of the upstream adsorber of the two active ones is measured, and in the batch phase of the one eluting the product (B), so at the outlet of adsorber 2 in steps 1-4 (first block), at the outlet of adsorber 1 in steps 5-8 (second block) and at the outlet of adsorber 4 in steps 9-12 (block 3) and at the outlet of adsorber 3 in steps 13-16 (block 4).

LIST OF REFERENCE SIGNS

| | |
|---|---|
| 1 | equilibration zone |
| 2 | feeding zone |
| 3 | washing zone |
| 4 | elution zone for W |
| 5 | recycle overlap zone, elution of the overlapping part W/P |
| 6 | pure product P elution zone |
| 7 | recycle overlap zone, elution of the overlapping part of P/S |
| 8 | cleaning and re-equilibration zone |
| I | interconnected phase |
| B | batch phase |
| B1 | first batch phase |
| I1 | first interconnected phase |
| B2 | second batch phase |
| I2 | second interconnected phase |
| W | weakly adsorbing impurity fraction |
| P | desired product fraction/compounds |
| S | strongly adsorbing impurity fraction |
| UV | UV signal |
| V | volume |
| t | time |
| Q | volumetric flow rate |

The invention claimed is:

1. A method for at least one of monitoring, evaluating and controlling a cyclic chromatographic purification process involving at least two adsorbers, through which a liquid with a feed mixture, comprising the desired product components as well as impurities, is passed,
   said purification process comprising at least two different phases,
   at least one interconnected phase, in which the two adsorbers are interconnected in that the outlet of an upstream adsorber is fluidly connected to the inlet of a downstream adsorber, and
   at least one batch phase, in which at least one adsorber is not fluidly connected to the others and in which the desired product components are recovered in purified form from a disconnected adsorber,
   wherein the method comprises at least the following steps:
   a. monitoring of the chromatogram including the measurement of at least one current concentration-proportional signal in the liquid;
   b. evaluation of the chromatogram including a comparison of at least one of said current concentration-proportional signals measured in step a. with a threshold value thereof;
   c. controlling the chromatographic purification process by adapting the termination of the currently running phase as a function of the comparison of step b. and initiating the next phase,
   wherein the sequence a-c is carried out in given order at least twice.

2. The method according to claim 1, wherein the concentration-proportional signal is taken account of in terms of at least one of its absolute value, its integral, its slope and the sign of its slope.

3. The method according to claim 1, wherein the concentration-proportional signal measured in step a. is measured at the outlet of at least one adsorber, at the outlet of two adsorbers or at the outlet of all adsorbers.

4. The method according to claim 1,
wherein said purification process comprising at least four different phases in given order,
wherein at least one first interconnected phase, in which two adsorbers are interconnected in that the outlet of an upstream adsorber is fluidly connected to the inlet of a downstream adsorber, solvent is entered by way of the inlet into the upstream adsorber, and desired product components as well as weakly adsorbing impurities are transferred from the upstream adsorber to the downstream adsorber;
wherein at least one first batch phase, in which the adsorbers are not fluidly connected, and in which solvent is entered by way of the inlet into the upstream adsorber from the first interconnected phase and via the outlet of this product-eluting adsorber the desired product components are collected, while liquid with a feed mixture is entered by way of the inlet into the downstream adsorber from the first interconnected phase;
wherein at least one second interconnected phase, in which the two adsorbers are interconnected in that the outlet of the upstream adsorber from the first interconnected phase is connected to the inlet of the downstream adsorber of the first interconnected phase, solvent is entered by way of the inlet into the upstream adsorber, and desired product components as well as strongly adsorbing impurities are transferred from the upstream adsorber to the downstream adsorber;
wherein at least one second batch phase, in which the adsorbers are not fluidly connected, and in which solvent is entered by way of the inlet into the upstream adsorber from the second interconnected phase and via the outlet of this former upstream adsorber the strongly adsorbing impurities are collected, while solvent is entered by way of the inlet into downstream adsorber from the second interconnected phase and via the outlet of this former downstream adsorber weakly adsorbing impurities are collected,
wherein the functions of the phases are either fulfilled synchronously or sequentially, and carried out in a cyclic manner at least twice, and
wherein when cycling after or within a switch time the former upstream adsorber from the second batch phase is moved to become the downstream adsorber in the following first interconnected phase, and the former downstream adsorber from the second batch phase is moved to become the upstream adsorber in the following first interconnected phase.

5. The method according to claim 4, wherein step a. includes measurement of at least one current concentration-proportional signal in the liquid at the outlet of the upstream adsorber in the first interconnected phase (I1).

6. The method according to claim 4, wherein the absolute value is measured, and
wherein upon exceeding an absolute value threshold, the following first batch phase is initiated, either as a fixed duration first batch phase or as a first batch phase having a length adapted upon further monitoring, evaluation and control, or
wherein upon exceeding an absolute value threshold, a fixed delay is waited until the following first batch phase is initiated, either as a fixed duration first batch phase or as a first batch phase having a length adapted upon further monitoring, evaluation and control, or wherein upon exceeding a first absolute value threshold, a minimum fixed delay is waited and after that upon exceeding a second absolute value threshold, the following first batch phase is initiated, either as a fixed duration first batch phase or as a first batch phase having a length adapted upon further monitoring, evaluation and control.

7. The method according to claim 4, wherein step a. includes measurement of at least one current concentration-proportional signal in the liquid at the outlet of the product eluting adsorber in the first batch phase.

8. The method according to claim 7, wherein upon falling below an absolute value threshold, the following second interconnected phase is initiated, either as a fixed duration second interconnected phase or as a second interconnected phase having a length adapted upon further monitoring, evaluation and control.

9. The method according to claim 7, wherein step a. includes measurement of at least one current concentration-proportional signal in the liquid at the outlet of the upstream adsorber in the second interconnected phase.

10. The method according to claim 1, wherein the cyclic chromatographic process uses at least two adsorbers and each cycle comprises at least two interconnected phases in which two adsorbers are fluidly connected for internal recycling of different partially pure side fractions.

11. The method according to claim 1, wherein a change of the sign of slope is used as criterion for a control action.

12. The method of claim 1, wherein an elution gradient of the process has a constant slope with respect to volume of liquid mobile phase used in the process over both interconnected and the first batch phase or a slope of zero.

13. The method according to claim 1 wherein the threshold for stopping a phase of the process and initiating a new phase of the process is defined in relation to the concentration-proportional signal recorded during the same or a previous cycle of the chromatographic process.

14. The method according to claim 1, wherein a control action is triggered based on failing to reach a defined threshold within a pre-determined elution volume or time or gradient concentration.

15. The method according to claim 1, wherein the concentration-proportional signal is based on visible light, UV, infrared, fluorescence, Raman, ionic strength, conductivity or refractive index measurement.

16. The method according to claim 1, wherein the concentration-proportional signal is taken account of in terms of a combination of at least two of its absolute value, its integral, its slope and the sign of its slope.

17. The method according to claim 1, wherein the concentration-proportional signal is measured at at least one of the following positions: the outlet of an adsorber being in a batch elution phase of the desired product, the outlet of an upstream adsorber in an interconnected phase.

18. The method according to claim 1,
wherein said purification process comprising at least four different phases in given order,
wherein at least one first interconnected phase, in which two adsorbers are interconnected in that the outlet of an upstream adsorber is fluidly connected to the inlet of a downstream adsorber, solvent is entered by way of the inlet into the upstream adsorber, and desired product components as well as weakly adsorbing impurities are transferred from the upstream adsorber to the downstream adsorber, until essentially only desired product components exit by the outlet of the upstream adsorber, wherein in line dilution is carried out between the upstream and the downstream adsorber;

wherein at least one first batch phase, in which the adsorbers are not fluidly connected, and in which solvent is entered by way of the inlet into the upstream adsorber from the first interconnected phase and via the outlet of this product-eluting adsorber the desired product components are collected, while liquid with a feed mixture is entered by way of the inlet into the downstream adsorber from the first interconnected phase and via the outlet of this adsorber weakly adsorbing impurities are collected;

wherein at least one second interconnected phase, in which the two adsorbers are interconnected in that the outlet of the upstream adsorber from the first interconnected phase is connected to the inlet of the downstream adsorber of the first interconnected phase, solvent is entered by way of the inlet into the upstream adsorber, and desired product components as well as strongly adsorbing impurities are transferred from the upstream adsorber to the downstream adsorber, until essentially no more desired product components exit by the outlet of the upstream adsorber, wherein in-line dilution is carried out between the upstream and the downstream adsorber;

wherein at least one second batch phase, in which the adsorbers are not fluidly connected, and in which solvent is entered by way of the inlet into the upstream adsorber from the second interconnected phase and via the outlet of this former upstream adsorber the strongly adsorbing impurities are collected, while solvent is entered by way of the inlet into downstream adsorber from the second interconnected phase and via the outlet of this former downstream adsorber weakly adsorbing impurities are collected, wherein the functions of the phases are either fulfilled synchronously or sequentially, and carried out in a cyclic manner at least twice, and wherein when cycling after or within a switch time the former upstream adsorber from the second batch phase is moved to become the downstream adsorber in the following first interconnected phase, and the former downstream adsorber from the second batch phase is moved to become the upstream adsorber in the following first interconnected phase.

19. The method according to claim 4, wherein step a. includes measurement at least one of the absolute value and the sign of its slope is measured, or a combination of the two.

20. The method according to claim 4, wherein the absolute value and also the sign of its slope are measured, and wherein upon exceeding an absolute value threshold, the following first batch phase is initiated, either as a fixed duration first batch phase or as a first batch phase having a length adapted upon further monitoring, evaluation and control, or wherein upon exceeding an absolute value threshold, a fixed delay is waited until the following first batch phase is initiated, either as a fixed duration first batch phase or as a first batch phase having a length adapted upon further monitoring, evaluation and control, or wherein upon exceeding a first absolute value threshold, a minimum fixed delay is waited and after that upon exceeding a second absolute value threshold, under checking the additional condition that its slope is positive, the following first batch phase is initiated, either as a fixed duration first batch phase or as a first batch phase having a length adapted upon further monitoring, evaluation and control.

21. The method according to claim 7, wherein upon falling below an absolute value threshold, under checking the additional condition that its slope is negative, the following second interconnected phase is initiated, either as a fixed duration second interconnected phase or as a second interconnected phase having a length adapted upon further monitoring, evaluation and control, and wherein the feeding of the non-product eluting adsorber in the first batch phase is started at the beginning of the first batch phase and is stopped, normally after a fixed feeding time, before the switch to the subsequent interconnected phase is initiated.

22. The method according to claim 7, wherein step a. includes measurement of at least one current concentration-proportional signal in the liquid at the outlet of the upstream adsorber in the second interconnected phase (I2), and wherein at least one of the absolute value and the sign of its slope is measured, or a combination of the two, wherein, under checking the additional condition that its slope is negative, upon falling below an absolute value threshold, the following second batch phase (B2) is initiated, either as a fixed duration second batch phase or as a second batch phase having a length adapted upon further monitoring, evaluation and control.

23. The method according to claim 1, wherein the cyclic chromatographic process uses at least two adsorbers and each cycle comprises at least two interconnected phases (IL I2) in which two adsorbers are fluidly connected for internal recycling of different partially pure side fractions (W/P, P/S), and wherein in step a. at least one of the absolute signal and its slope is measured at the outlet of the respective upstream adsorber.

* * * * *